United States Patent [19]

Hayakawa et al.

[11] Patent Number: 4,679,450
[45] Date of Patent: Jul. 14, 1987

[54] CONTROL SYSTEM FOR SELECTIVELY SWITCHABLE TWO/FOUR WHEEL DRIVE AUTOMATIC TRANSMISSION SYSTEM SHIFTING TRANSFER TRANSMISSION ACCORDING TO MAIN TRANSMISSION SPEED STAGE

[75] Inventors: Yoichi Hayakawa; Masao Kawai, both of Anjo; Yutaka Taga, Toyota; Kazuaki Watanabe, Toyota; Yoshiharu Harada, Toyota, all of Japan

[73] Assignees: Aisin-Warner Limited, Anjo; Toyota Jidosha Kabushiki Kaisha, Toyota, both of Japan

[21] Appl. No.: 758,442

[22] Filed: Jul. 24, 1985

[30] Foreign Application Priority Data

Jul. 28, 1984 [JP] Japan ................. 59-157905

[51] Int. Cl.$^4$ ............................................. B60K 41/04
[52] U.S. Cl. .................. 74/752 A; 74/868; 74/740
[58] Field of Search ............... 74/865, 853, 855, 856, 74/866, 867, 868, 869, 752 A, 752 D, 740, 745; 180/247, 250, 233

[56] References Cited

U.S. PATENT DOCUMENTS

| | | | |
|---|---|---|---|
| 3,963,085 | 6/1976 | Vinton | 180/250 |
| 4,324,153 | 4/1982 | Sugimoto et al. | 74/866 |
| 4,411,174 | 10/1983 | Yokoi et al. | 74/866 |
| 4,444,073 | 4/1984 | Moroto et al. | 180/247 |
| 4,481,877 | 11/1984 | Takano et al. | 74/869 |
| 4,503,927 | 3/1985 | Hayakawa et al. | 74/869 |
| 4,552,036 | 11/1985 | Takano et al. | 180/247 |

FOREIGN PATENT DOCUMENTS 152623 11/1980 Japan .
86825 7/1981 Japan .

Primary Examiner—Allan D. Herrmann
Assistant Examiner—David Novais
Attorney, Agent, or Firm—Oblon, Fisher, Spivak, McClelland & Maier

[57] ABSTRACT

A transmission control system for an automatic transmission for a vehicle having a main transmission unit which provides a plurality of speed stages and an auxiliary transmission unit which is connected in series with the main transmission unit and provides two very different speed reduction ratios such as 1 and 3 such as desirable for a transmission selectively operative in a two wheel drive operational mode or in a four wheel drive operational mode, the auxiliary transmission being manually switched over between the two different speed reduction ratios, wherein there is provided a means for controlling the auxiliary transmission unit to override the manual control of the auxiliary transmission in a manner only to prevent switching over of the auxiliary transmission unit to the larger speed reduction ratio according to at least one parameter with regard to operational conditions of the vehicle and also according to which of the plurality of speed stages the main transmission unit is set.

4 Claims, 13 Drawing Figures

CONTROL SYSTEM FOR SELECTIVELY SWITCHABLE TWO/FOUR WHEEL DRIVE AUTOMATIC TRANSMISSION SYSTEM SHIFTING TRANSFER TRANSMISSION ACCORDING TO MAIN TRANSMISSION SPEED STAGE

BACKGROUND OF THE INVENTION

The present invention relates to the field of control of vehicle transmissions which are switchable between two wheel drive operation and four wheel drive operation, and in particular to the field of such control systems which operate automatically to switch the transmissions between a plurality of speed stages according to vehicle operational conditions.

Automatic transmissions for vehicles are per se known: such an automatic transmission provides one or the other of various speed stages (i.e. gearing ratios) between the vehicle engine and the wheels thereof, according to various operational conditions of the vehicle such as engine load and vehicle road speed, as well as according to the set position of a manual range setting means such as a lever which is set by the driver to one of several operational ranges such as "D" range, "2" range, and "L" range. The switching pattern between these speed stages is typically described by a shift pattern diagram.

Now, recently vehicles which can be optionally switched between a two wheel drive mode of operation and a four wheel drive mode have become more and more popular. Such a vehicle typically incorporates in its power train, typically after the main transmission unit thereof, a transfer transmission unit which can be switched either to provide power to the rear wheels only of the vehicle or to provide power to all the four wheels of the vehicle.

However, because the vehicle running characteristics are very much different between the four wheel drive operational mode of the vehicle and the two wheel drive operation mode, various problems have arisen.

Specifically, it has been known to incorporate into such a transmission unit also a means for providing an optional very low gear capability, i.e. a means for optionally selecting a speed reduction ratio which is substantially greater than unity such as, for example, 3.0. This is for providing a very strong capability for the vehicle to climb a hill or to escape from a muddy slough or the like. Therefore, if such an auxiliary transmission unit having a large speed reduction ratio is abruptly put into the lower speed stage operation when the vehicle is running at a relatively high speed, a large inertia shock will occur, thereby causing not only a great physical danger to the driver and passengers but also causing mechanical problems in the vehicle such as engine overrunning, wheel locking, etc. For switching such an auxiliary transmission unit between its high and its low speed, typically hydraulically driven wet multiplate clutch or brake, or alternatively a dog clutch operated by the vacuum pressure generated for the vehicle braking system has been used. Such a structure is disclosed in, for example, Japanese Patent Laying-Open Publications Nos. 55-152623 and 56-86825.

In order to avoid such problems due to the high inertia shock caused by abrupt downshifting of a high speed reduction ratio auxiliary transmission unit, it has been practiced to prevent the lower speed stage of the auxiliary transmission unit from being engaged, if the vehicle road speed has been over a certain predetermined value.

However, the above-mentioned problems due to the abrupt engagement to the lower speed stage of the auxiliary transmission depend not only upon the vehicle road speed at which the lower speed stage of the auxiliary transmission unit is engaged, but also upon other operational conditions of the vehicle such as engine throttle opening or accelerator pedal depression at that instant, the speed stage of the main transmission unit being engaged at the time, etc. Therefore, it is disadvantageous to cut off the utility of the auxiliary transmission unit by restricting the operational range thereof only in a region where vehicle road speed is less than a predetermined generally relatively low value.

SUMMARY OF THE INVENTION

Accordingly, it is the primary object of the present invention to provide a control system for an automatic transmission system including a main transmission unit and an auxiliary transmission unit having a relatively large speed reduction ratio such as to be combined with a transfer transmission unit for changing over the transmission between a two wheel drive operational mode in which driving power is transmitted to only two wheels of the vehicle and a four wheel drived operational mode in which driving power is transmitted to four wheels of the vehicle.

It is a further object of the present invention to provide such a transmission control system for such an automatic transmission, which enables the vehicle driver to use such an auxiliary transmission unit or the transfer transmission unit in wider operational conditions of the vehicle.

It is a further object of the present invention to provide such a transmission control system for such an automatic transmission, which can avoid troublesomely great transmission shock while ensuring maximum utility of the automatic transmission.

It is yet a further object of the present invention to provide such a transmission control system for such an automatic transmission, which can provide maximum utility of the changing-over system between the two wheel drive operational mode and the four wheel drive operational mode.

According to the most general aspect of the present invention, these and other objects are accomplished by, for an automatic transmission system for a vehicle, comprising a main transmission unit which can be set to any one of a plurality of speed stages, an auxiliary transmission unit which is connected in series with said main transmission unit and can be selectively set either a first speed reduction ratio or a second speed reduction ratio substantially larger than said first speed reduction ratio, and a means for manually controlling said auxiliary transmission unit to select either said first speed reduction ratio or said second speed reduction ratio, a transmission control system comprising: (a) a means for controlling said main transmission unit automatically to provide each selected one of said plurality of speed stages according to operational conditions of the vehicle; and (b) a means for controlling said auxiliary transmission unit to override said manual control means in a manner only to prevent shifting of said auxiliary transmission unit to said second speed reduction ratio according to at least one parameter with regard to operational conditions of the vehicle and also according to which of said plurality of speed stages said main transmission unit is set.

According to such a structure, the prevention of the shifting of the auxiliary transmission unit to the lower speed stage is controlled not only according to a parameter with regard to operational conditions of the vehicle which may be the vehicle road speed as in the conventional construction but also according to the speed stage at which the main transmission unit is set, thereby also taking into consideration the other operating conditions of the vehicle or the engine which are mutually interrelated via the speed reduction ratio in the transmission, such as rotational speed of the engine which is exactly related with the vehicle road speed via the speed reduction ratio of the transmission, and other various operational parameters concerned with the motion of the vehicle such as the rotational inertia of the overall transmission system, etc. Therefore, the conditions for controlling said auxiliary transmission unit to override said manual control means in a manner to prevent shifting of said auxiliary transmission unit to the large speed reduction ratio can be designed more to approach the critical limits with regard to a larger number of conditions concerned.

BRIEF DESCRIPTION OF THE DRAWINGS

The present invention will now be shown and described with reference to the preferred embodiments thereof, and with reference to the illustrative drawings. It should be clearly understood, however, that the description of the embodiments, and the drawings, are given purely for the purposes of explanation and exemplification only, and none of them are intended to be limitative of the scope of the present invention in any way, since the scope of the present invention is to be defined solely by the legitimate and proper scope of the appended claims. In the drawings, like parts and spaces and so on are denoted by like reference symbols in the various figures thereof; in the description, spatial terms are to be everywhere understood in terms of th relevant figure; and:

DESCRIPTION OF THE PREFERRED EMBODIMENTS

Figure 1:
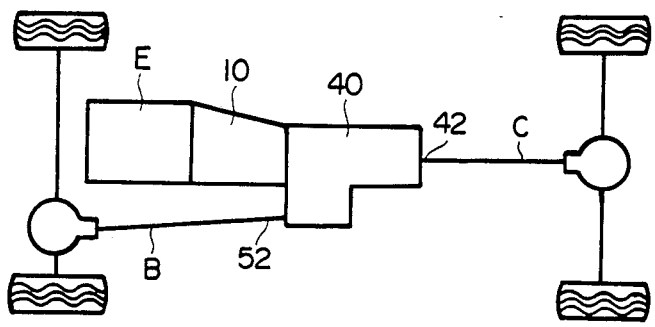
FIG. 1 is a schematic block diagrammatical plan view of the power train of an automotive vehicle, said power train incorporating a transmission system which is capable of providing either two wheel drive or four wheel drive operation, and which relates to both of the preferred embodiments of the present invention which will be disclosed.
Figure 2:
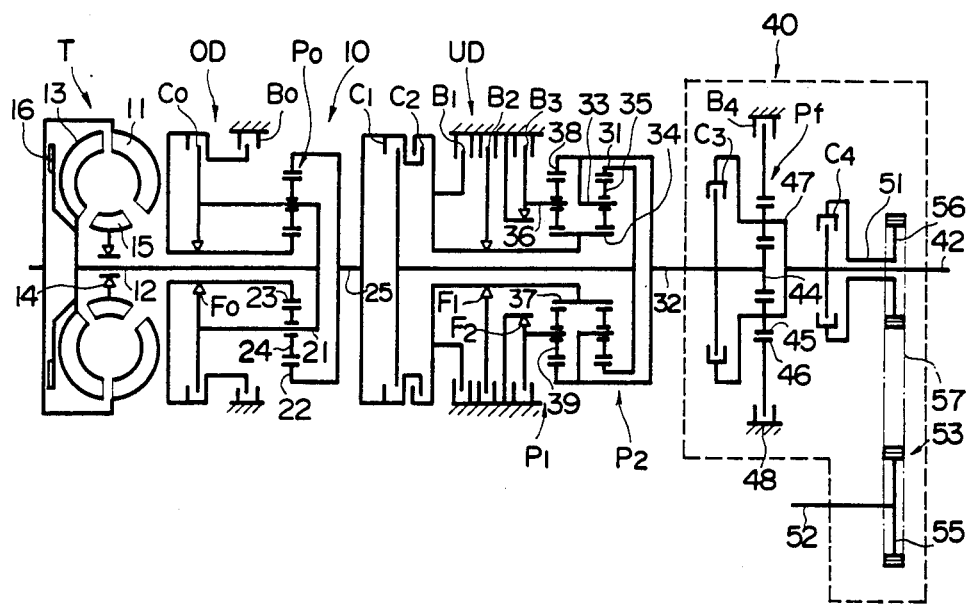
FIG. 2 is a schematic skeleton view of the major rotational power transmitting components of said transmission system, and again relates to both the preferred embodiments.
Figure 3:
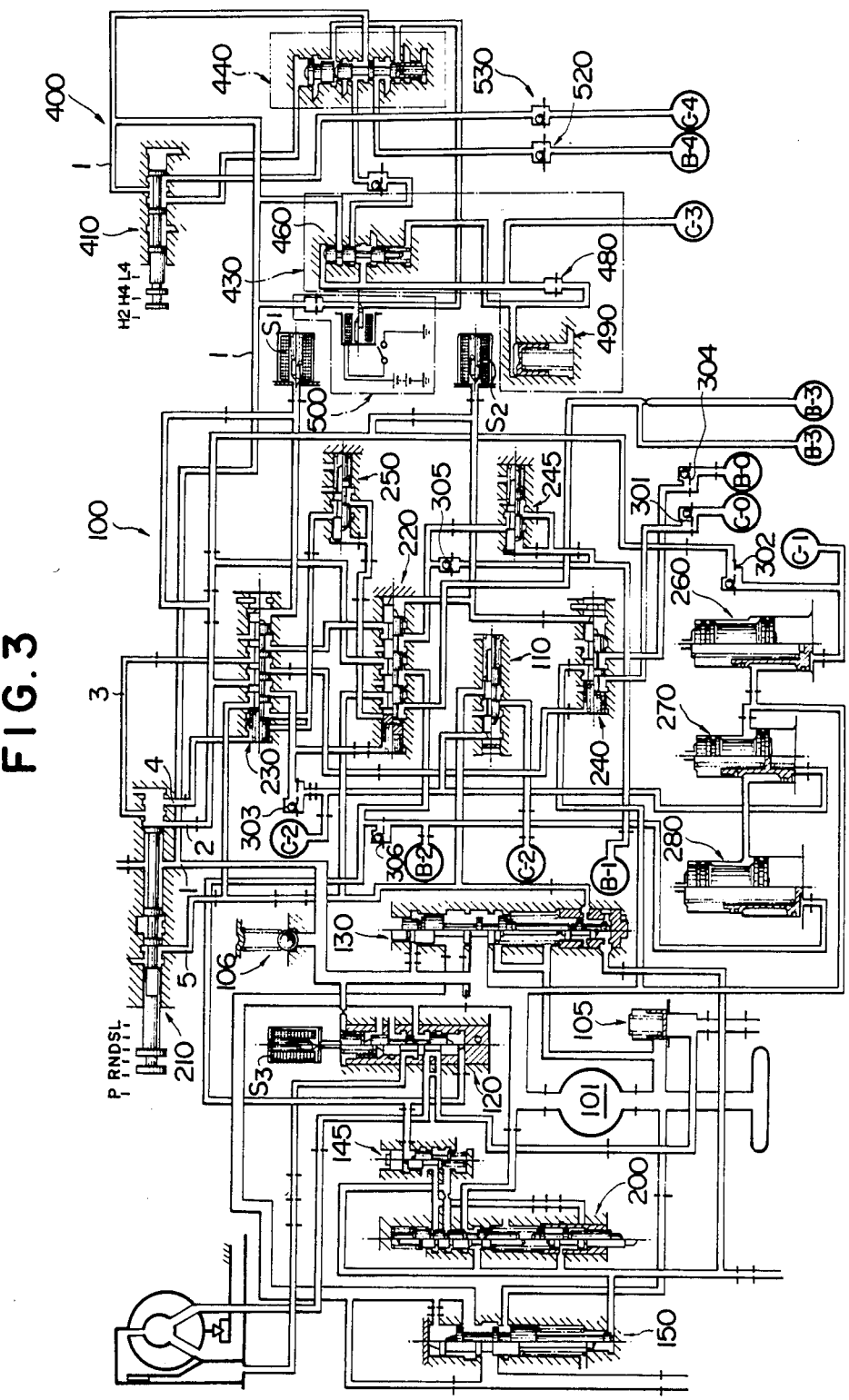
FIG. 3 is a general hydraulic circuit diagram of a hydraulic fluid pressure control system for the transmission system of FIG. 2, and again relates to the both the preferred embodiments.

The present invention will now be described with reference to the preferred embodiments thereof, and with reference to the figures. FIGS. 1 through 3 relate to both of the preferred embodiments which will be disclosed: FIG. 1 is a schematic plan view of the power train of a four wheel drive type automotive vehicle, and FIG. 2 is a schematic skeleton view showing the major rotational power transmitting components of a transmission system incorporated in said power train which is controlled by either of the preferred embodiments of the present invention.

Referring first to FIG. 1 in which the various power train elements are shown merely as blocks, the reference symbol E denotes the engine of the automotive vehicle, and this engine E is coupled to and provides rotational power to a main transmission unit 10 which is an automatic transmission and has a plurality of speed stages, including an overdrive speed stage, which are selectively engaged according to operational conditions of the automotive vehicle as will be described in detail hereinafter. The rotational power output of this main transmission 10 is supplied to a transfer transmission unit 40 which can be selectively set to operate either in a two wheel drive mode or a four wheel drive mode. As will also be explained in detail hereinafter: when said transfer transmission 40 is set to its four wheel drive mode, then it supplies output rotational power both to a rear power output shaft 42, which is rotationally connected via a rear propeller shaft C and a rear differential unit to the rear wheels of the vehicle, and also to a front power output shaft 52, which is rotationally connected via a front propeller shaft B and a front differential unit to the front wheels of the vehicle; while on the other hand, when said transfer transmission 40 is set to its two wheel drive mode, then it supplies output rotational power in said manner via its rear power output shaft 42 to the rear wheels of the vehicle, only, but does not supply any output rotational power via its front power output shaft 52 to the front wheels.

Referring next to the skeleton view of FIG. 2, the operation of the gear trains of the abovementioned main transmission 10 and transfer transmission 40 will be explained.

The main transmission 10 comprises, in the order of power transmission, a fluid torque converter T, an overdrive unit OD, and an underdrive unit UD; thus, each of these units drives the next one. The fluid torque converter T provides, in a per se known fashion, a torque amplification and a fluid clutch function; the overdrive unit OD can be selectively set by means which will be explained hereinafter either to a direct connection mode or to an overdrive mode; and the underdrive unit UD can be selectively set by means which also will be explained hereinafter to any one of three forward speed stages and one reverse speed stage.

In detail, the torque converter T comprises a pump inpeller 11 which is rotationally driven by the power output shaft of the engine E via a power input shaft, a driven turbine member 13 which is rotationally coupled to the power output shaft 12 of said torque converter T, and a stator member 15 which is rotatably mounted to the casing of the torque converter T via a one way clutch 14. In a per se known manner, by circulation of hydraulic fluid (which fills the casing of the torque converter T) around a toroidal path defined by the pump impeller 11, the driven turbine 13, and the stator member 15 in the manner of a smoke ring, the pump impeller 11 is rotationally coupled to the driven turbine member 13 with a certain amount of torque amplification and slippage being provided therebetween, and thus the power input shaft of the torque converter T is rotationally coupled to its power output shaft 12 with a certain amount of torque amplification and slippage being provided therebetween. A direct clutch 16 is also incorporated for selectively, when actuated to be engaged, again in a per se known manner providing a direct connection between the pump impeller 11 and the driven turbine 13. The power output shaft 12 of the torque converter T also serves as a power input shaft for the overdrive device OD.

The overdrive device OD comprises a multi plate clutch C0 and a multi plate brake B0, both of which are per se known friction engaging mechanisms which selectively are actuated by selective supply of pressurized hydraulic fluid to their pressure chambers (not particularly shown), and also comprises a one way clutch F0 and a planetary gear mechanism P0, and by such selective actuation of the clutch C0 and the brake B0 either provides direct connection between its power input shaft 12 and its power output shaft 25, or provides a speed increasing function therebetween. In detail, the power input shaft 12 is connected to a carrier 21 of the planetary gear mechanism P0, and this planetary gear mechanism P0 also has a ring gear 22 which is rotationally connected to the power output shaft 25 of the overdrive device OD, a sun gear 23, rotatably mounted on the power input shaft 12, which is selectively coupled to the casing of said overdrive device OD via the brake B0, and a plurality of planetary pinions 24 which are rotatably mounted to the carrier 21 and which are meshed with the ring gear 22 and the sun gear 23 and perform planetary movement therebetween in a per se known way. And, further, the sun gear 23 and the carrier 21 are selectively couplable together via the clutch C0, and are also, with respect to mutual rotation in one rotational direction only, always coupled together via the one way clutch F0. This gear train operates, according to selective actuation of the clutch C0 and the brake B0, in a manner which will be clear to one of ordinary skill in the relevant art based upon the descriptions given herein and hence will not be elaborated upon in detail.

The power output shaft 25 of the overdrive device OD also serves as a power input shaft for the underdrive device UD. The underdrive device UD comprises multi plate clutches C1 and C2 and multi plate brakes B1, B2 and B3, all of which again are per se known friction engaging mechanisms which selectively are actuated by selective supply of pressurized hydraulic fluid to their pressure chambers (not particularly shown), and also comprises one way clutches F1 and F2 and planetary gear mechanisms P1 and P2 respectively for forward and for reverse; and by selective actuation of the clutches C1 and C2 and the brakes B1 through B3 the underdrive device UD either provides a (forward) direct connection between its power input shaft 25 and its power output shaft 32, or provides a forward speed decreasing function therebetween, or provides a reverse speed decreasing function therebetween. In detail, the power input shaft 25 is connected via the clutch C1 and an intermediate shaft to a ring gear 31 of the reverse planetary gear mechanism P2, and this reverse planetary gear mechanism P2 also has: a carrier 33 which is connected to the power output shaft 32 of this underdrive mechanism UD and also to the ring gear 38 of the other forward planetary gear mechanism P1, a sun gear 34, rotatably mounted on the aforementioned intermediate shaft, which is selectively coupled to the casing of the underdrive device UD via the brake B1 and also is (in parallel) is selectively coupled in one rotational direction only to said casing via the one way clutch F2 and the brake B2, as well as being selectively coupled to the power input shaft 25 via the clutch C2, and a plurality of planetary pinions 35 which are rotatably mounted to the carrier 33 and which are meshed with the ring gear 31 and the sun gear 34 and perform planetary movement therebetween in a per se known way. And, further, the sun gear 34 is integrally formed with a sun gear 37 for said other forward planetary gear mechanism P1, which further, as well as the aforementioned ring gear 38 which is as mentioned coupled to the power output shaft 32, has a carrier 36 which is selectively coupled via the brake B3 to the casing of the underdrive unit UD and is also always coupled in one rotational direction only to said underdrive unit casing via the one way clutch F1. And, again, a plurality of planetary pinions 39 incorporated in this forward planetary gear mechanism P1 are rotatably mounted to its carrier 36 and are meshed with its ring gear 38 and its sun gear 34 and perform planetary movement therebetween in a per se known way. This gear train operates, according to selective actuation of the clutches C1 and C2 and the brakes B1 through B3, in a manner which will be clear to one of ordinary skill in the relevant art based upon the descriptions given herein and hence will not be elaborated upon in detail.

Taken together, therefore, the combined function of the overdrive unit OD and the underdrive unit UD both described above, it that: according to selective engagement of the clutches C0 through C2 and the brakes B0 through B3 by a control system 100 which will be descibed hereinafter, according to the combinations as shown in Table 1 which is given at the end of this specification and before the claims thereof, there are provided in various speed ranges, in total four forward speed stages (one of which is an overdrive speed stage) and one reverse speed stage. (In this Table 1, the symbol "O" with reference to a clutch or a brake denotes engagement, while the symbol "X" denotes disengagement; and, with reference to a one way clutch, the symbol "L" denotes locking up so as to transmit torque, while the symbol "F" denotes free running). And, by the operation of this control system as will be explained later, these four forward stages are switched automatically, according to the operational conditions of the vehicle such as road speed, engine load, and so on, and according to the particular forward speed range such as "D", "S", or "L" set by the position of a manual range setting valve 210 which will be described later, while the reverse speed stage is engaged, only, when said range setting valve is manually set to an "R" range.

The power output shaft 32 of the underdrive device UD also serves as a power input shaft for the transfer transmission 40. This transfer transmission 40 has a planetary gear mechanism Pf associated with a clutch C3 and a brake B4 both of the same selectively actuatable types as outlined previously, and further has another clutch C4 for selective provision of four wheel drive operation. In detail, the power input shaft 32 is connected to a sun gear 44 of the planetary gear mechanism Pf, and is also connected via the clutch C3 to a carrier 47 thereof and to the previously mentioned power output shaft 42 for the rear wheels of the vehicle, which is coaxial with said power input shaft 32 and extends out to the outside of the transmission 40, towards the rear of the vehicle. And a ring gear 46 of the planetary gear mechanism Pf is selectively connected via the brake B4 to the casing of this transmission 40, while, as before, a plurality of planetary pinions 45 incorporated in this planetary gear mechanism Pf are rotatably mounted to the carrier 47 and are meshed with the ring gear 46 and the sun gear 44 and perform planetary movement therebetween in a per se known way. On the power output shaft 42 for the rear wheels there is rotatably fitted a sleeve 51 with which a sprocket 56 is integrally formed, and this sleeve 51 and sprocket 56 are selectively rotationally couplable to said shaft 42 by the aforementioned clutch C4. The front wheel power output shaft 52 is rotatably fitted in the casing of the transfer transmission 40 and extends therefrom in the opposite direction to that of the shaft 42, in other words towards the front of the vehicle. On this shaft 52 there is fitted by splines or the like a sprocket 55, and an endless chain 57 fitted around the sprockets 56 and 55 and provides transmission of rotation power therebetween. Thus, this sprocket and chain drive mechanism and the clutch mechanism C4 constitute a selectably engagable tramsmission system 53 for selectively driving the front wheels of the vehicle. The mechanism for thus selectively engaging the clutch C4 will be explained hereinafter.

Next, referring to the general hydraulic circuit diagram thereof shown in FIG. 3, the hydraulic fluid pressure control system 100 for the combination of the overdrive unit OD and the underdrive unit UD will be explained. This control system 100 comprises a hydraulic fluid pump 101 which sucks up and pressurizes hydraulic fluid from a sump, not shown. Further, the control system 100 comprises a first regulator valve 130, a second regulator valve 150, a cooler bypass valve 105, a pressure relief valve 106, a reverse clutch sequence valve 110, a throttle pressure control valve 200 which produces an output hydraulic fluid pressure which is indicative of throttle opening of the engine E—i.e. of the load on said engine E—a cut back valve 145, a lock up clutch control valve 120, a manual range setting valve 210 which can be manually set by the hand of the driver of the automotive vehicle to any one of "P" or park range, "R" or reverse range, "N" or neutral range, "D" or drive range, "S" or second range and "L" or low range (as shown in Table 1), a first/second speed shift valve 220, a second/third speed shift valve 230, and a third/fourth speed shift valve 240. A solenoid valve S1 controls the first/second speed shift valve 220 and the third/fourth speed shift valve 240, another solenoid valve S2 controls the second/third speed shift valve 230 and the third/fourth speed shift valve 240, and a third solenoid valve S3 controls the lock up clutch control valve 120. An intermediate coast modulator valve 245 is provided for adjusting the pressure supply to the servo unit B-1 of the brake B1, a low coast modulator valve 250 is provided for adjusting the pressure supply to the servo unit B-3 of the brake B3, an accumulator 260 is provided for adjusting the pressure supply to the servo unit C-1 of the clutch C1, an accumulator 270 is provided for adjusting the pressure supply to the servo unit C-2 of the clutch C2, an accumulator 280 is provided for adjusting the pressure supply to the servo unit B-2 of the brake B2, and flow control valves fitted with check valves and respectively denoted by the symbols 301, 302, 303, 304, 305, and 306 control the supplies of hydraulic fluid pressure to the respective servo units C-0, C-1, C-2, B-0, B-1, and B-2 of the clutches and brakes C0, C1, C2, B0, B1, and B2, respectively. Further, various hydraulic conduits including conduits 1 through 5 which communicate to the manual range setting valve 210, as shown in the figure, interconnect these various elements and chambers thereof, so as to communicate the hydraulic chambers of the servo units of the various friction engaging devices (the clutches and brakes) via various chambers of the various valves to be either supplied with hydraulic fluid pressure or to be drained, according as the various valves are positioned at their various positions; the details will easily be supplemented by one of ordinary skill in the transmission art, based upon the disclosure herein and upon the figure. The solenoids S1, S2, and S3 are selectively either energized or not energized by an electrical control system not shown in FIG. 3 but described hereinafter, according to the current values of various operational parameters of the vehicle such as road speed and engine load, and according to the set position of the manual range setting valve 210. Table 2, which again is given at the end of this specification and before the claims thereof, shows the state of communication or discommunication with the conduit 1 of each of the conduits 2 through 5, in each of the set ranges of the manual range setting valve 210. In this table, the symbol "O" denotes communication with the conduit 1, while the symbol "X" denotes discommunication therefrom.

Figure 4:
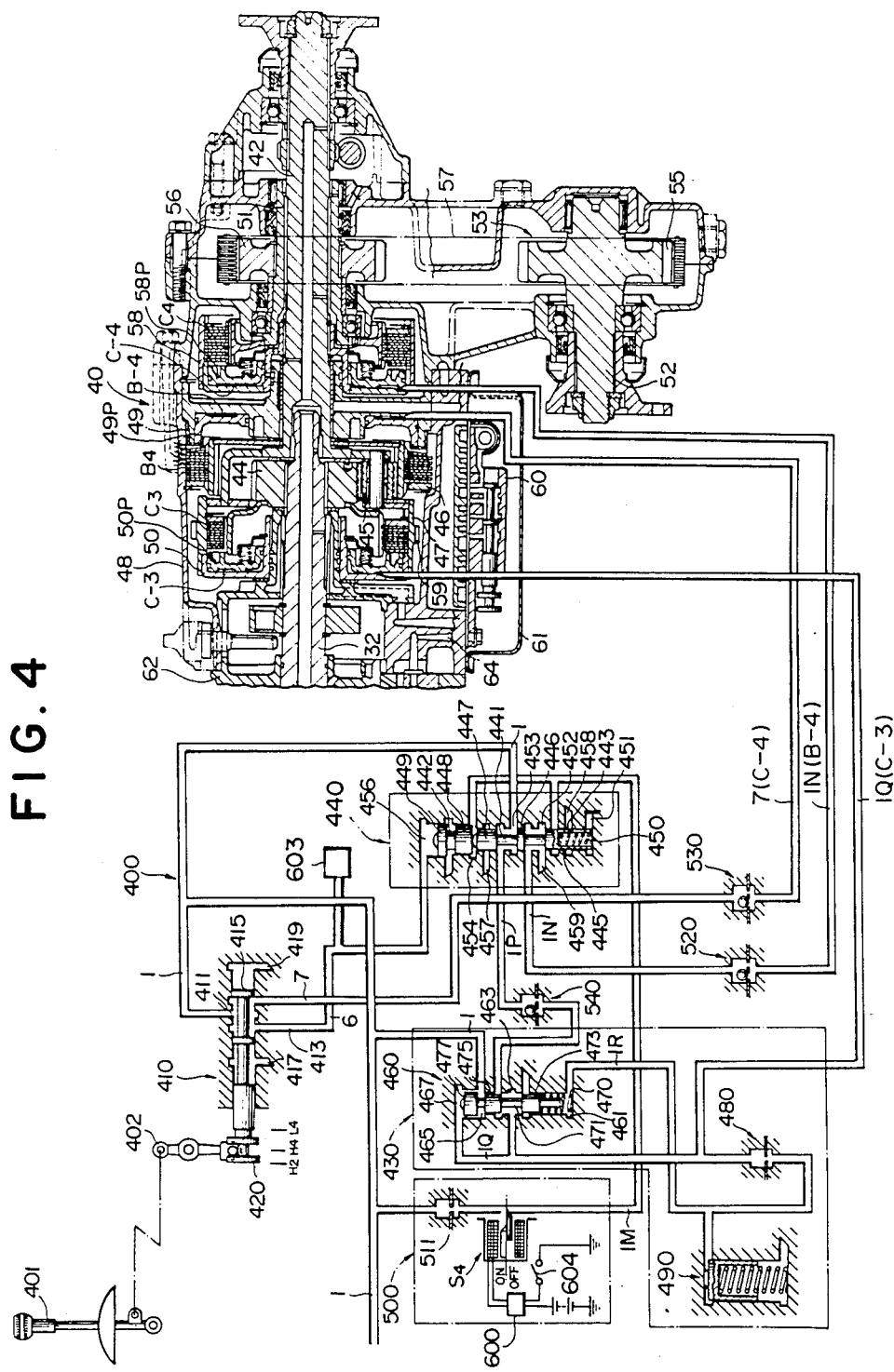
FIG. 4 is a detailed view of a part of said hydraulic fluid pressure control system, and also shows the constructional details of a transfer transmission unit which is schematically shown in FIG. 2, as they are constituted in the particular case of the first preferred embodiment of the present invention.

Next, referring to the particular hydraulic circuit diagram thereof shown in FIG. 4, which is an enlarged portion of the general circuit shown in FIG. 3 as it is particularly realized in the case of the first preferred embodiment of the transmission control system of the present invention, the hydraulic fluid pressure control system 400 for the transfer transmission 40 will be explained. A particular possible physical construction, in the case of this first preferred embodiment, for this transfer transmission 40 is also shown in FIG. 4. This transfer transmission 40 comprises the elements described earlier in this specification with regard to FIG. 2, which are structurally shown in FIG. 4: the brake B4 is a multiplate friction brake which selectively engages the ring gear 46 to the case 48 of the transmission, and its servo unit B-4 comprises a cylinder 49 formed in the case 48 and a piston 49P. The clutch C3 is a multiplate friction clutch which is fitted on the transmission 10 side of the planetary gear mechanism Pf, and either connects together the sun gear 44 and the carrier 47 or not; its servo unit C-3 comprises a cylinder 50 coupled to the carrier 47 and a piston 50P reciprocating in the cylinder 50. The clutch C4 is a multiplate friction clutch and either connects together the output shaft 42 for the rear wheels of the vehicle which is coupled to the carrier 47, and the sleeve 51 which is coupled to the sprocket 56 at one end of the transfer transmission 53 for driving the output shaft 52 for the front wheels of the vehicle, or not; its servo unit C-4 comprises a cylinder 58 rotatably supported by the case 48 and a piston 58P reciprocating in the cylinder 58. The transfer transmission system 53 comprises the sprocket 56 which is formed on the sleeve 51, the sprocket 55 which is splined on the shaft 52, and the endless chain 57 connecting these sprockets 55 and 56 together. A parking gear 59 surrounds the outside of the cylinder 50 of the servo C-3 for the clutch C3; when the shift lever of the manual range setting valve 210 is positioned to the "P" or parking position, then a parking claw, not shown, engages therewith and thereby locks the shaft 42.

A valve body 60 is provided in the transfer transmission 40 for constituting a hydraulic control device for supplying and/or exhausting hydraulic fluid pressure to/from the pressure chambers of the servo units C-3, C-4, and B-4 for the clutches C3 and C4 and the brake B4; and the reference numeral 61 denotes a sump pan. Hydraulic pressure is supplied to the servo units C-3, C-4, and B-4 via the transmission case 62 and a conduit 64 provided in the casing 48 to the transfer transmission valve 60 of the transfer transmission control device 400.

During normal operation of the vehicle, the servo unit C-3 receives line pressure from the hydraulic control device of the automatic transmission, by the select lever 401 of FIG. 4 being manually positioned by the hand of the driver to an "H2" position, so that the clutch C3 is engaged, while the servo unit B-4 of the brake B4 is drained and the servo unit C-4 of the clutch C4 is drained, thus disengaging these two frictional engaging devices. Thus, in the planetary gear mechanism Pf, the sun gear 44 and the carrier 47 are coupled together, and power is thus transmitted from the shaft 32 to the power output shaft 42 for the rear wheels at a gearing ratio of unity, whence said power is transmitted via the propeller shaft C (see FIG. 1) to the rear wheels of the vehicle. Further, the transfer transmission device 53 is disengaged, and thus no power is transmitted to the front wheels of the vehicle. Thus, as a whole, the vehicle transmission is operating in the direct two wheel drive operational condition. At this time, the power is being transmitted from the shaft 32, not through the sun gear 44 or the planetary pinions 45 or the ring gear 46, but through the clutch C3 and the carrier 47 only, and hence the gears of the transmission 40 are not being subjected to any wear; thereby, their life is maximized. This is called the "H2" operational mode.

Now, to alter from the two wheel drive operational mode to the four wheel drive operational mode, the select lever 401 is manually moved by the hand of the driver to its "H4" position as indicated in FIG. 4, and this causes a gradual supply of line pressure to the pressure chamber C-4 of the clutch C4, thus gradually engaging said clutch C4. This causes the power output shaft 42 for the rear wheels to be gently and progressively coupled to the sleeve 51, and power is thereby transmitted form said shaft 42, via the sleeve 51 and the sprocket 56, through the endless chain 57, to the sprocket 55 and thence to the power output shaft 52 for the front wheels of the vehicle, whence said power is transmitted via the propeller shaft B (see FIG. 1) to the front wheels of the vehicle. And, of course, the previously mentioned transmission of power to the rear wheels of the vehicle is continued in this operational mode. Thus, as a whole, the vehicle transmission is now operating in the direct four wheel drive operational condition. Again, at this time, the power is being transmitted from the shaft 32 through the clutch C3 and the carrier 47 only, not via the planetary gear mechanism Pf, and hence the gears of the transmission 40 are not being subjected to any wear; thereby, their life is maximized. This is called the "H4" operational mode.

Further, when operating in this "H4" operational mode, if it is desired to obtain a higher torque for mounting a hill or pulling through a mud slough or the like, then the select lever 401 of FIG. 4 is manually positioned by the hand of the driver to the "L4" position, so that an inhibitor valve 440, which swaps between the high speed four wheel drive and the low speed four wheel drive conditions, is released to be operable between the above two conditions. Under this condition, as described in more detail hereinunder, if the port 454 of the inhibitor valve 440 is supplied with the line pressure through a passage 1M, the spool 441 is still shifted down as shown in FIG. 4, and the high speed four wheel drive is continued as in the "H4" operational mode. However, if the supply of the line pressure through the passage 1M is interrupted by a solenoid valve S4 being energized so as to open a drain port 600a, the spool 441 is shifted up and the supply of the line pressure to the passage 1P is switched over to the passage 1N, and thereby the clutch C3 is disengaged by smooth and progressive draining of the pressure chamber of its servo unit C-3, while simultaneously the servo unit B-4 of the brake B4 is smoothly and progressively supplied with line pressure, thus swapping over the engagement conditions of these two frictional engaging devices, while the servo unit C-4 of the clutch C4 is maintained as supplied with line pressure. Thereby, the sun gear 44 and the carrier 47 of the planetary gear mechanism Pf are disengaged from one another, while the ring gear 46 is fixed to the casing of the transmission;

and thereby power is transmitted from the shaft 32 to the power output shaft 42 for the rear wheels through sun gear 44, the planetary pinions 45, and the ring gear 46 of the planetary gear mechanism Pf at a gearing ratio greater than one, i.e. at a higher gearing ratio than before, and thence via the propeller shaft C (see FIG. 1) to the rear wheels of the vehicle; while said power is also transmitted at said same higher gearing ratio via the transfer transmission device 53 which is engaged and via the propeller shaft B to the front wheels of the vehicle. This is called the "L4" operational mode.

Table 3, which again is given at the end of this specification and before the claims thereof, shows the state of engagement and disengagement of each of the frictional engaging devices C3, C4, and B4, in each of the set operational modes H2, H4, and L4 of the select lever 40. In this table, the symbol "O" denotes engagement, while the symbol "X" denotes disengagement. Further, Table 3 shows the overall speed ratio provided by the transfer transmission unit 40; this ratio may be easily calculated by one of ordinary skill in the transmission art, where x is the ratio between the number of teeth upon the sun gear 44 and the number of teeth upon the the gear 46, using the formula $(1 \times x)/x$.

The control system 400 for the transfer transmission 40, shown in FIG. 4 for the first preferred embodiment, comprises the select lever 401 which is provided conveniently for operation by the driver of the vehicle and has high speed (direct) and low speed (reduction) positions, said select lever 401 being linked by a link mechanism 402 with a transfer manual valve 410 which has a spool element 420. Further, the control system 400 comprises: the aforementioned inhibitor valve 440 for switchover between the two wheel drive direct transmission operational condition, the four wheel drive direct transmission operational condition, and the four wheel drive direct/reduction transmission operational condition; an accumulator control valve 460 between said inhibitor valve 440 and the servo unit C-3 for the clutch C3; an upshift (L4 to H4) timing mechanism 430 comprising an accumulator 490 and a throttling element 480; a transfer automatic control device 500 controlling the input pressure for the inhibitor valve 440 (which is a pressure relating to vehicle speed) to conduit 1M coupled to the conduit 1, so that when the vehicle speed is below a particular determinate value a controller 600 energizes the solenoid valve S4 to open the drain port 600a; and a vehicle speed sensor 501; a throttling element fitted with a check valve 520 provided in the passage 1N for the servo unit B-4 of the clutch B4; a throttling element fitted with a check valve 530 provided in the passage 7 for the servo unit C-4 of the clutch C4; and a throttling element fitted with a check valve 540 provided in the passage 1P connecting the inhibitor valve 440 and the timing mechanism 430.

The spool element 402 of the transfer manual valve 410 is coupled via the link mechanism 402 with the select lever 401 which is accessible by the driver seated in the driver seat, and has: an in port 411 which is connected to the line pressure conduit 1 of the hydraulic control system for the four speed transmission 10; an out port 413 which is connected to a conduit 6, an out port 415 which is connected to a conduit 7, and drain ports 417 and 419. In the H2 position for two wheel drive operation, the spool element 420 communicates the conduits 1 and 6 together, while the conduit 7 is communicated to the drain port 419 and is drained; in the H4 position for high speed four wheel drive, said spool element 420 communicates the conduits 1 and 6 and 7 together; and, in the L4 position for high/low speed four wheel drive, said spool element 420 communicates the conduits 1 and 7 together, while the conduit 6 is communicated to the drain port 417 and is drained.

The inhibitor valve 440 has the spool element 441 which is biased upwards in the figure by a spring 450 mounted in a bottom chamber 457 open to a drain port 458, and a plunger 442 is fitted in series with the spool element 441. This spool element 441 has: a sleeve shaped land 445 formed with a port 443 at its lower end in the figure, on which said spring 450 bears; a top land 447; and a middle land 446. The plunger 442 has a bottom land 448 of greater diameter than the lands of the spool element 441, and also has a top land 449 of greater diameter than its said bottom land 448. Thus, the spool element 441 and the plunger 442 together define: first and second intermediate chambers 452 and 453 between the lands 445, 446, and 447; a chamber 454 between the lands 447 and 448; and an upper hydraulic fluid chamber 456.

The accumulator control valve 460 has a spool element 471 which is biased upwards in the figure by a spring 470. This spool element 471, further, has a bottom land 473, an intermediate land 475, and a top land 477 which is somewhat larger in diameter than the lands 473 and 475. Thereby, there are defined a lower chamber 461, intermediate chambers 463 and 465, and an upper chamber 467. The chamber 463 is permanently connected to the conduit 1Q which leads to the servo C-3 for the clutch C3, while the chamber 465 is permanently connected to the line pressure conduit 1; the chamber 467 receives the fed back pressure in the conduit 1Q, while the chamber 461 is supplied pressure from the conduit 1R which connects to the line 1Q via a throttling element 480 and an accumulator 490.

The automatic control mechanism 500 for the transfer transmission 40 comprises a vehicle speed sensor 604, which provides an input to the speed change control device 600 which will be explained hereinafter, and a throttling element 511 in the conduit 1M connected to the conduit 1; and the solenoid valve S4 is controlled to be either ON or OFF by said speed change control device 600 to selectively drain the passage 1M at the downstream side of said orifice 511 so as to modify the pressure in the passage 1M. When the vehicle road speed is higher than a determinate speed value, for example 20 km/h, then the solenoid valve S4 is turned OFF by the control device 600, and line pressure from the conduit 1 is present in the conduit 1M; but, on the other hand, when the vehicle road speed is lower than said determinate speed value of exemplarily 20 km/h, then the solenoid valve S4 is turned ON by the control device 600, and the conduit 1M is drained. Thus, the pressure in said conduit 1M depends upon the vehicle speed. The solenoid ON/OFF setting can be easily changed in the speed change control device 600 based upon the input from the vehicle speed sensor 501, so it is easy for the driver to change, depending upon the current road conditions. The line pressure is transmitted from the conduit 1 to the intermediate chamber 465, and the conduit 7 is connected through the combination 530 of throttling element and check valve to the servo chamber C-4 of the clutch C4.

Now, the operation of the transfer transmission 40 in each of its ranges will be explained.

First, when the transfer manual valve 410 is set to the "H2" range, then the conduit 7 is drained, so the pressure chamber of the servo unit C-4 of the clutch C4 is drained, and no rotational power is transmitted through said clutch C4 to the sleeve 51, and the transfer transmission 40 stays in the two wheel drive state. At this time, line pressure is supplied to the conduit 6, so that the spool element 441 and the plunger 442 of the inhibitor valve 440 are at their lower positions as seen in the figure, and the conduit 1N is communicated to the port 459 and is drained, so the pressure chamber of the servo unit B-4 of the brake B4 is drained. Further, the conduit 1P is connected to the line pressure conduit 1, and via the throttling element and check valve 540 and the accumulator control valve 460 to the conduit IQ, so that pressure is supplied to the pressure chamber of the servo unit C-3 of the clutch C3, which accordingly is engaged. Accordingly, the transfer transmission 40 is set to its directly connected condition in which only the power output shaft 42 which leads to the rear wheels is powered, i.e. to its "H2" or two wheel drive direct connection operational condition.

On the other hand, when the transfer manual valve 410 is set to the "H4" range, then the conduit 7 is also supplied with line pressure as well as the conduit 6, so the pressure chamber of the servo unit C-4 of the clutch C4 is pressurized, and this clutch C4 is thereby engaged to transmit rotational power to the sleeve 51, and the transfer transmission 40 is thereby put into the four wheel drive state. At this time, as mentioned above, still line pressure is supplied to the conduit 6, so that the spool element 441 and the plunger 442 of the inhibitor valve 440 are at their lower positions as seen in the figure, and the conduit 1N communicated to the port 459 is drained, so the pressure chamber of the servo unit B-4 of the brake B4 is drained; on the other hand the conduit 1P is connected to the line pressure conduit 1, and via the throttling element and check valve 540 and the accumulator control valve 460 to the conduit 1Q, so that pressure is supplied to the pressure chamber of the servo unit C-3 of the clutch C3, which accordingly is engaged. Accordingly, the transfer transmission 40 is set to its directly connected condition in which both the power output shaft 42 which leads to the rear wheels and the power output shaft 52 which leads to the front wheels are powered, i.e. to its "H4" or four wheel drive direct connection operational condition.

Finally, when the transfer manual valve 410 is set to the "L4" range, then as just described above the conduit 7 is supplied with line pressure, so that the pressure chamber of the servo unit C-4 of the clutch C4 is pressurized, and this clutch C4 is thereby engaged to transmit rotational power to the sleeve 51, and the transfer transmission 40 is thereby put into the four wheel drive state. Now, on the other hand, at this time line pressure is no longer supplied to the conduit 6, which is instead drained, so that the spool element 441 and the plunger 442 of the inhibitor valve 440 are allowed to move to their upper positions as viewed in the figure, and the conduit 1N can be pressurized, so the pressure chamber of the servo unit B-4 of the brake B4 is pressurized to engage said brake B4; on the other hand, as opposite to the conduit 1N, the conduit 1P can be drained, so that no pressure is supplied to the pressure chamber of the servo unit C-3 of the clutch C3, which accordingly is disengaged. In this case, the transfer transmission 40 is set to its speed reducing condition in which both the power output shaft 42 which leads to the rear wheels and the power output shaft 52 which leads to the front wheels are powered to four wheel drive speed reducing operational condition.

Now, if the vehicle speed is higher than a certain determinate value, and the solenoid S4 is OFF, then, when the transfer manual valve 410 is set to the "L4" range, line pressure is supplied to the conduit 1M, and the spool element 441 of the inhibitor valve 440 remains held down by the line pressure in the chamber 454.

When the vehicle speed is lower than said certain determinate value, the solenoid S4 is switched ON, and then the conduit 1M is drained, so that the spool element 441 of the inhibitor valve 440 is now moved upwards in the figure by the spring 450, so that the conduits 1 and 1N are communicated together, and thereby line pressure is supplied to the pressure chamber of the servo unit B-4 of the brake B4 and said brake B4 is engaged, while the conduit 1P is connected to the drain port 457 and is drained, whereby the pressure chamber of the servo unit C-3 of the clutch C3 is drained and said clutch C3 is disengaged. Thereby the transfer transmission 40 is set to the low speed four wheel drive operational condition. After once reaching this low speed four wheel drive operational condition, even if later the vehicle speed rises to the above said certain determinate value, and the solenoid S4 comes to be OFF, the pressure in the line 1M supplied to the port 454 of the inhibitor valve 440 is interrupted by the land 447 of the spool element 441, so that the spool element 441 does not move, and the low speed four wheel drive operational condition is maintained until the manual valve 410 is shifted to the "H4" or the "H2" position, thereby avoiding hunting of the transfer transmission between the direct transmission operational mode and the reducing operational mode.

Figure 5:
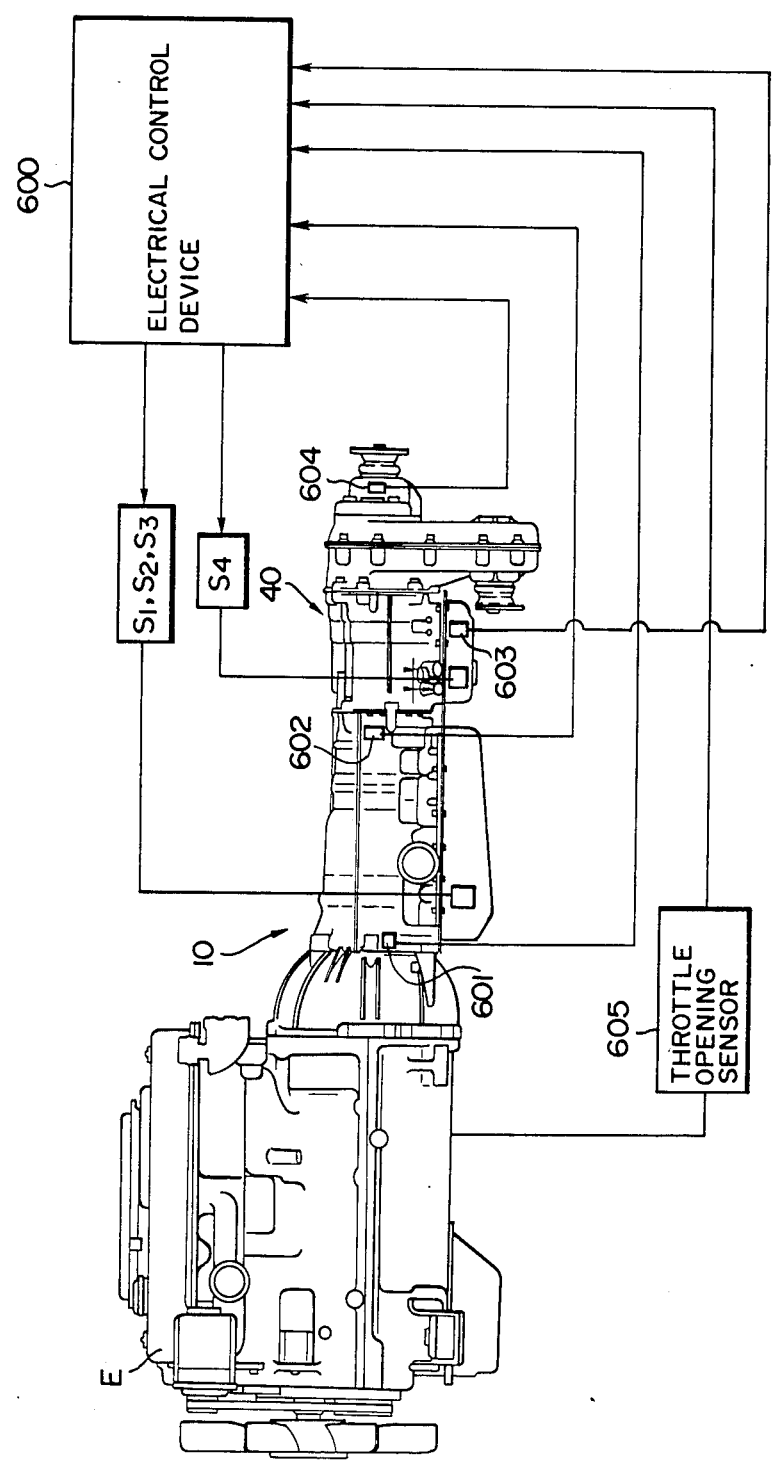
FIG. 5 is a schematic view of the power train as a whole in said first preferred embodiment of the present invention, and also shows in block diagrammatical form an electrical control system control system for the transmission system, again as relating to the first preferred embodiments.
Figure 6:
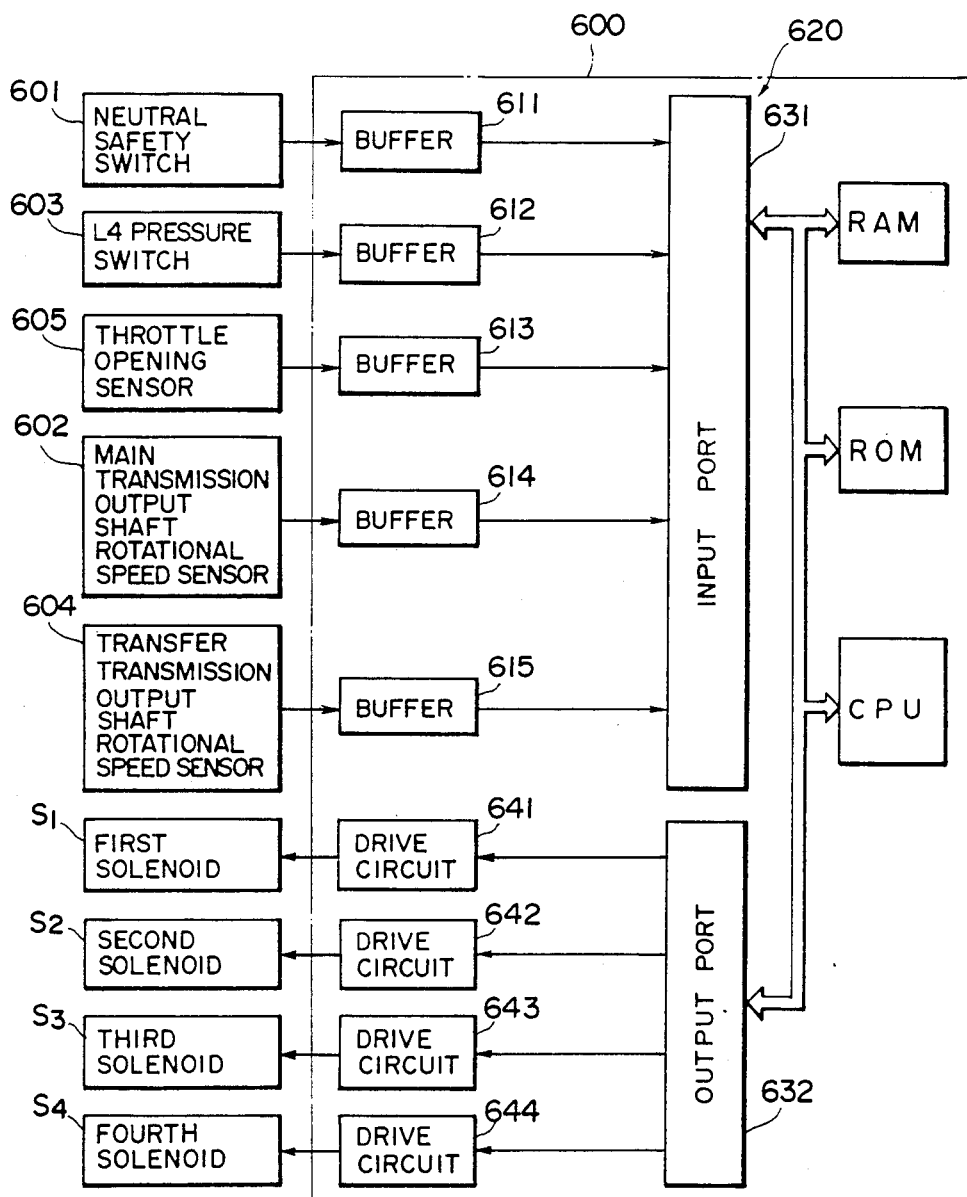
FIG. 6 is a block diagrammatical illustration of the structure of said electrical control system for said transmission in said first preferred embodiment, also showing in block diagram form certain sensors thereof.

Now, referring to FIG. 5 which is a schematic view of the power train as a whole in this first preferred embodiment of the present invention and also shows in block diagrammatical form an electrical control system 600 for the transmission system, and to FIG. 6 which is a detailed block diagram of said electrical control system 600 and also shows various sensors and solenoids thereof, the manner in which said electrical control system 600 controls the transmission system described above will be explained. The electrical control system 600 comprises a microcomputer 620 of a per se known sort, which has the input port 631 and an output port 632, and also has a CPU, a ROM, a RAM, and so on, all interconnected by a bus. The output port 632, according to commands supplied thereto by the CPU, provides electrical output signals SD1 through SD4 for controlling the four solenoids S1 through S4 mentioned previously, via drive circuits 641, 642, 643, and 644 respectively; and the input port 631 receives the following signals from the following sensors and transmits to the CPU values representative of their values: a neutral switch signal from a neutral safety switch 601 which detects the position of the shift lever of the transmission 10; a transmission output shaft rotational speed signal from a transmission output shaft rotational speed sensor 602; a L4 pressure signal from a L4 pressure switch 603 which is fitted between the inhibitor valve 440 and the valve 410 in the conduit 6 so as to detect when the pressure is drained from the conduit 6 (i.e., when the driver of the vehicle selects the L4 operational mode on the shift lever 401 of the transfer transmission 40); a transfer transmission output shaft rotational speed signal from a transfer transmission output shaft rotational speed sensor 604 which detects the rotational speed of the output shaft of the transfer transmission 40, converting it to vehicle speed; and a throttle opening signal from a throttle opening sensor 605, which detects the amount of depression of the accelerator pedal of the vehicle (which is taken as a parameter representative of load on the engine E of the vehicle). All of these signals are inputted to the microcomputer 620 through the input port 630 via respective buffers therefor designated as 611, 612, 613, 614, and 615. And the ROM of the microcomputer holds data representative of speed change patterns and the like, as will be expatiated upon shortly.

Figure 7:
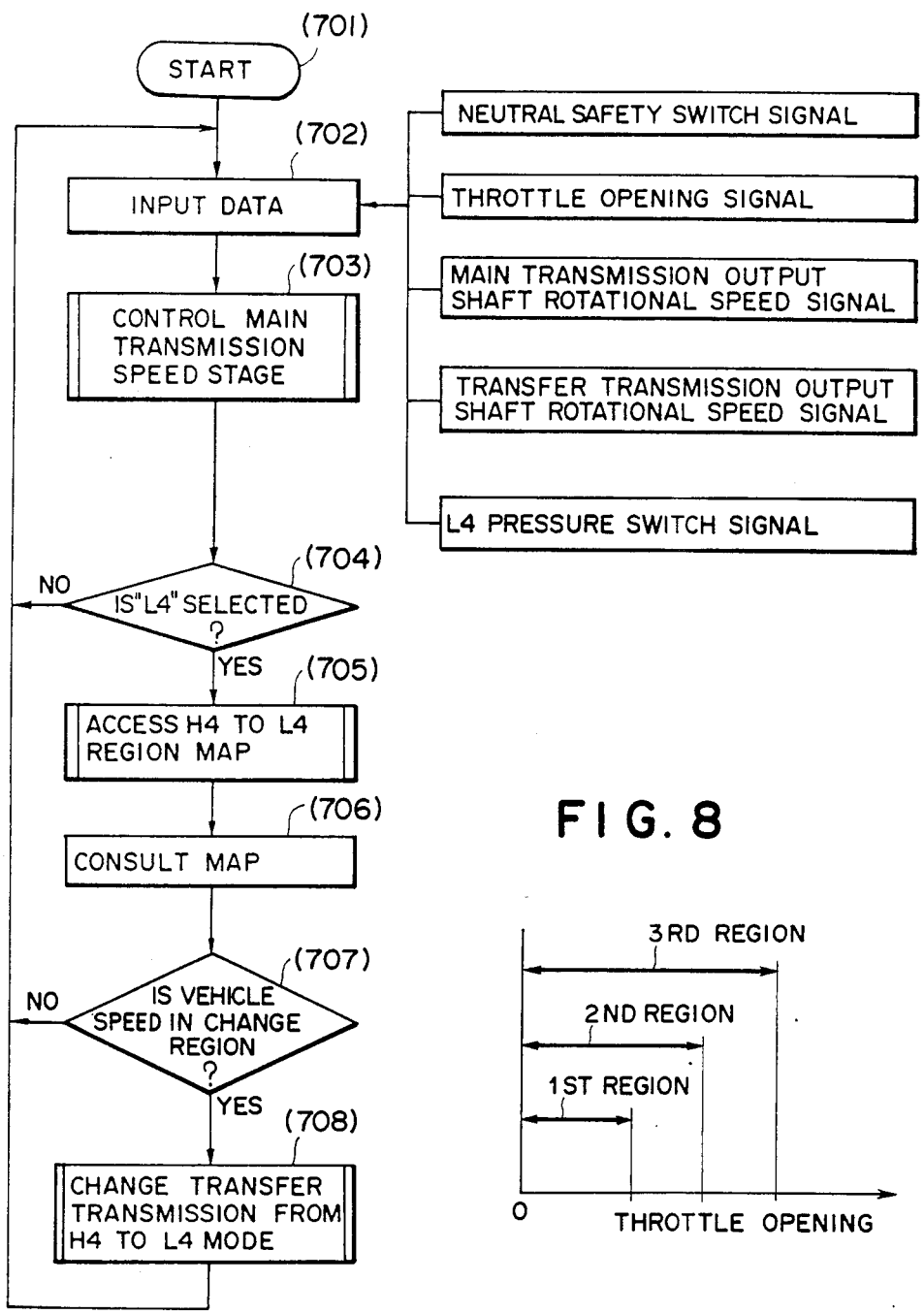
FIG. 7 is a flow chart of the operation of a microcomputer incorporated in said electrical control system for said transmission, according to said first preferred embodiment of the present invention.

Now, with reference to the flow chart shown in FIG. 7, the operation of this first preferred embodiment of the electrical control system of the present invention will be explained, insofar as it need be understood in order to comprehend the principle of said first preferred embodiment of the present invention.

At the START block (701) the engine of the vehicle is started by turning the ignition switch on, and the program starts. Next, in the (702) block, the CPU, under control of the program, inputs data from its various sensors detailed above, i.e., inputs: the neutral safety switch signal from the neutral safety switch 601; the transmission output shaft rotational speed signal from the transmission output shaft rotational speed sensor 602; the L4 pressure signal from the L4 pressure switch 603; the transfer transmission output shaft rotational speed signal from the transfer transmission output shaft rotational speed sensor 604; and the throttle opening signal from the throttle opening sensor 605. Next, in the (703) block, the speed stage selection control of the main transmission 10 is performed in a manner which is per se known in the transmission art.

Next, in the (704) block, the flow of control branches according to whether or not the L4 pressure signal from the L4 pressure switch 603 indicates an "L4" position of the select lever 401 of the transfer transmission 40, or not; if the select lever 401 is set to the "L4" position, then the flow of control passes to the block (705), whereas, on the other hand, if the select lever is not set to the "L4" position, that is, if the select lever is set to the "H2" position or the "H4" position, then the flow of control is cycled around again, to again pass back to the (702) block and repeat the above explained cycle.

Figure 8:
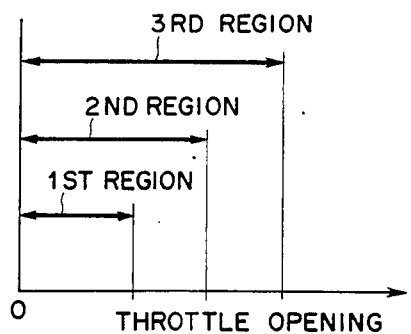
FIG. 8 is a shift diagram in which vehicle speed is shown along the horizontal axis and engine load (i.e. throttle opening) is shown along the vertical axis, showing the various four wheel drive possible engagement operational areas according to main transmission speed stage, in this first preferred embodiment.
Figure 9:
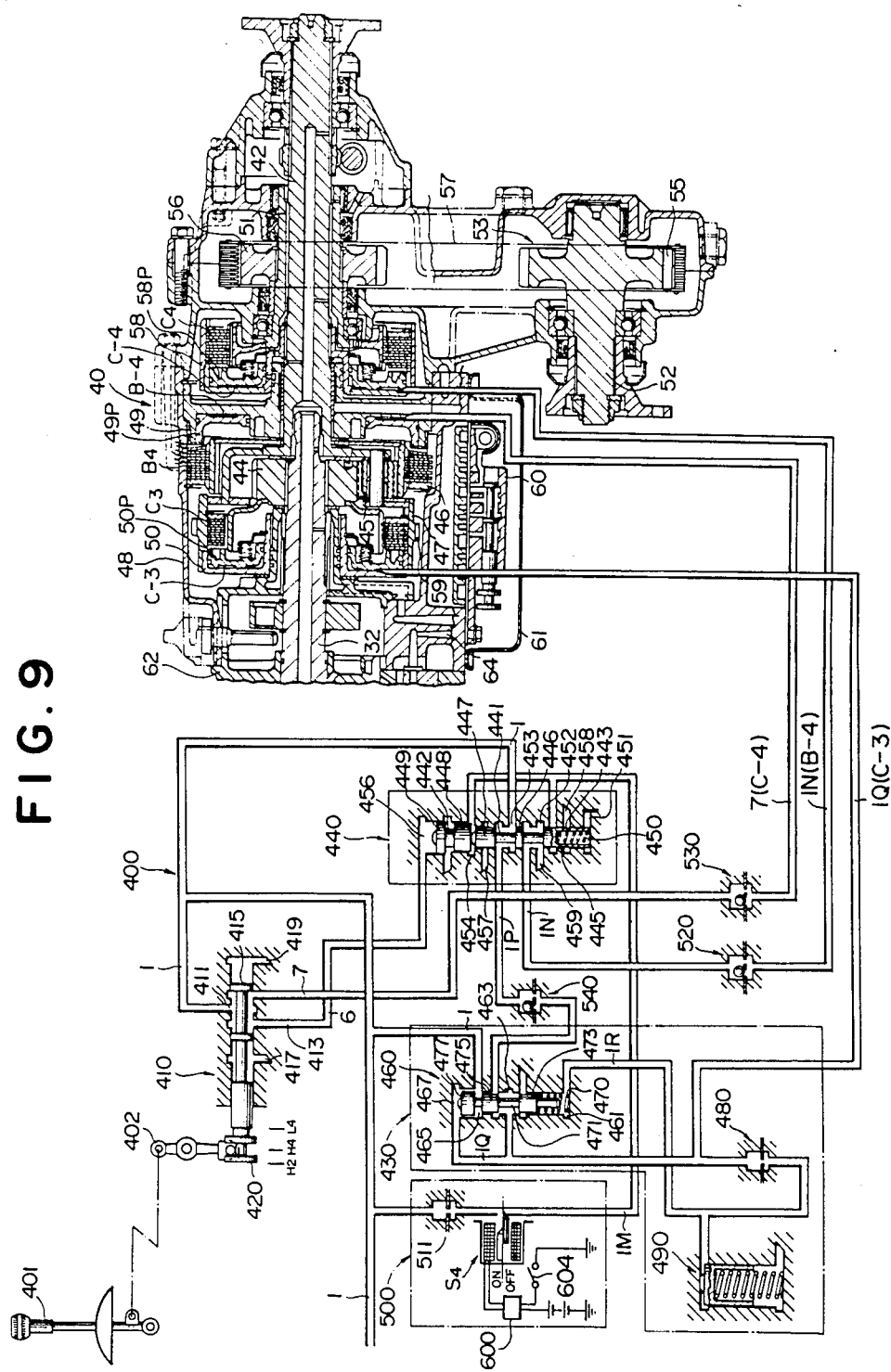
FIG. 9 is similar to FIG. 4, being a detailed view of a part of the hydraulic fluid pressure control system and also showing the constructional details of a transfer transmission unit which is schematically shown in FIG. 2, as they are constituted in the particular case of the second preferred embodiment of the present invention.
Figure 10:
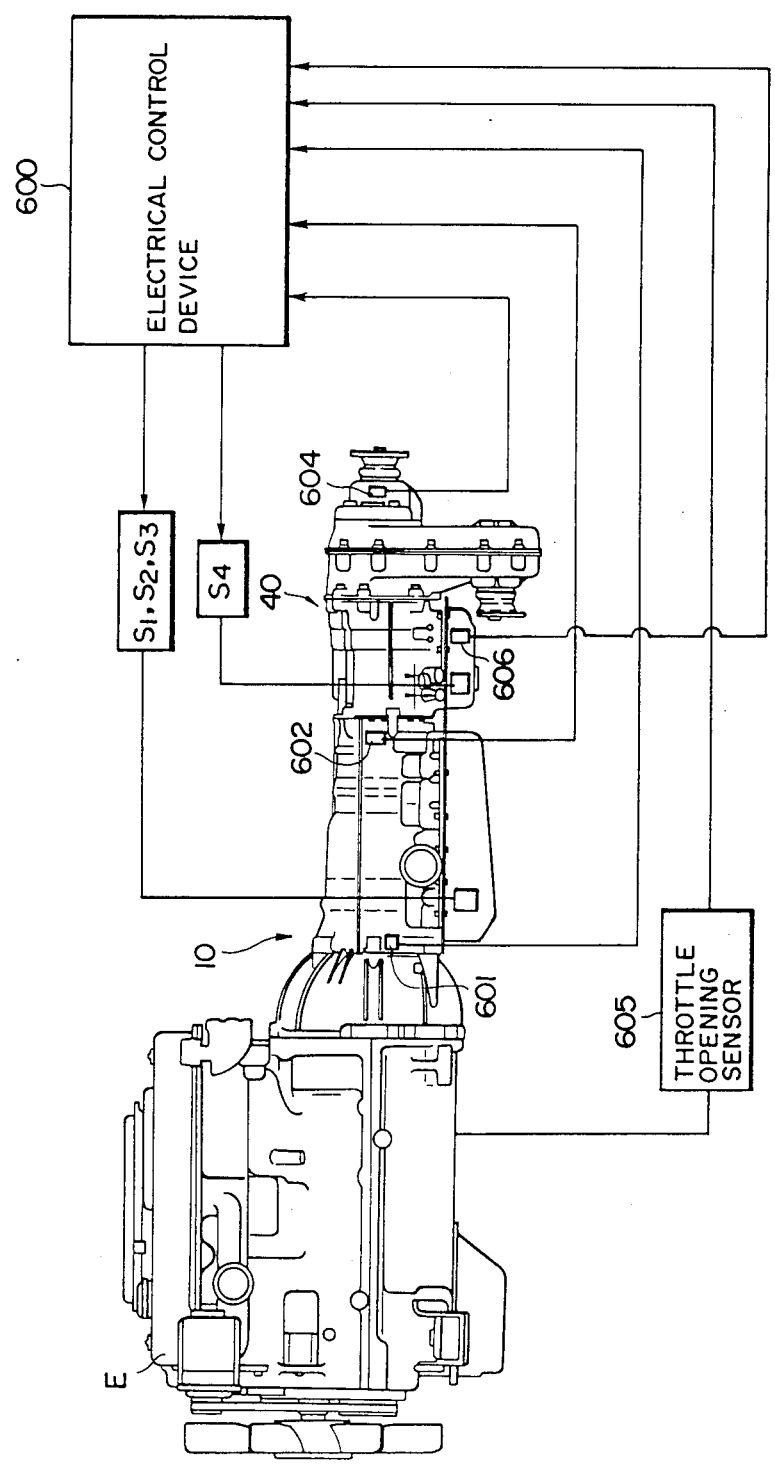
FIG. 10, which is similar to FIG. 5, is a schematic view of the power train as a whole in said second preferred embodiment of the present invention, and also shows in block diagrammatical form an electrical control system control system for the transmission system, again as relating to the second preferred embodiment.
Figure 11:
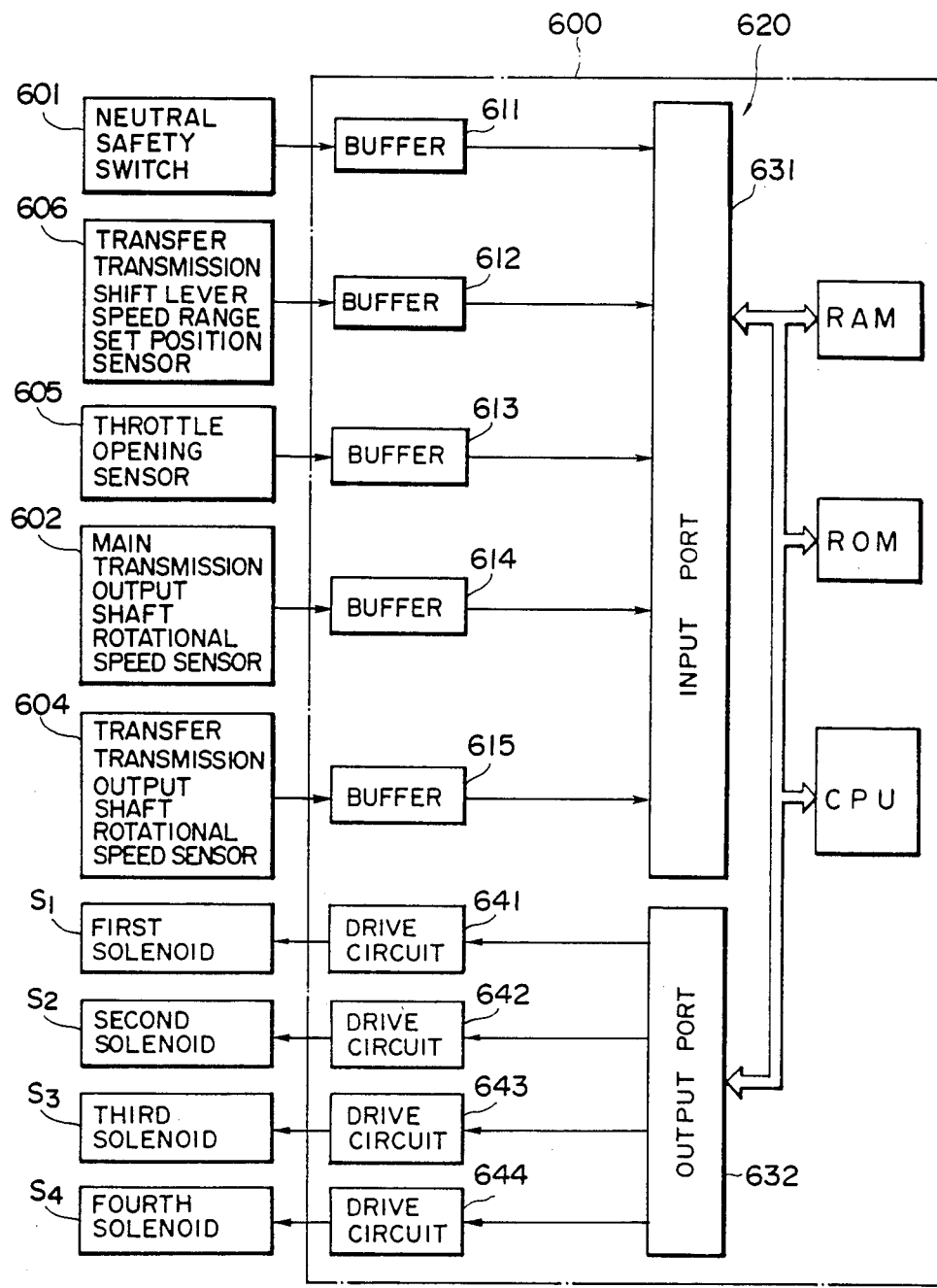
FIG. 11, which is similar to FIG. 6, is a block diagrammatical illustration of the structure of said electrical control system for said transmission in said second preferred embodiment, also showing in block diagram form certain sensors thereof.

In the former case, i.e. if the select lever 401 is set to the "L4" position, then the flow of control passes to the block (705), wherein a H4 to L4 speed change region map such as the map exemplarily shown in FIG. 8 is accessed to be used (such as by being read into the microcomputer memory). Next, in the block (706), the vehicle speed range for which an H4 to L4 change is possible for the current shift lever position is extracted from the map of FIG. 8; and next, in the block (707), a test is made as to whether the current value of the vehicle speed is within this range, or not. If the answer to this test is NO, so that no question of changing over the transfer transmission arises, then again the flow of control is cycled around again, to again pass back to the (702) block and repeat the above explained cycle; but, if the answer to this test is YES, so that the transfer transmission should be changed over, then the flow of control passes to the (708) block, wherein the transfer transmission 40 is indeed changed over from the H4 operational mode to the L4 operational mode, by the means explained hereinabove. And, finally, again the flow of control is cycled around again, to again pass back to the (702) block and repeat the above explained cycle.

FIGS. 9 through 13 relate to the second preferred embodiment of the present invention, and correspond respectively to FIGS. 4 through 8 relating to the first preferred embodiment described above. In these figures, parts and spaces and so on like to those of the first preferred embodiment are denoted by the same reference numerals as in FIGS. 4 through 8.

In this second preferred embodiment, the control system 600 has, in place of the L4 pressure switch 603 of the first preferred embodiment for detecting the position of the shift lever 401, instead a transfer transmission 40 shift lever 401 speed range setting position sensor 606; and the computer 620 inputs the signal from this sensor 606, as well as the previously mentioned signals from the sensors 601, 602, 604, and 605 which are the same as in the first preferred embodiment. For each speed range the vehicle speed and throttle opening ranges for which an H4 to L4 change is possible are determined (as per FIG. 13 for example); and, if both the vehicle speed and throttle opening are in the ranges for an H4 to L4 change, then the microcomputer 620 outputs the appropriate signals to the solenoids S1 through S3 of the main transmission 10 and to the solenoid S4 of the transfer transmission 10 for said H4 to L4 change.

Figure 12:
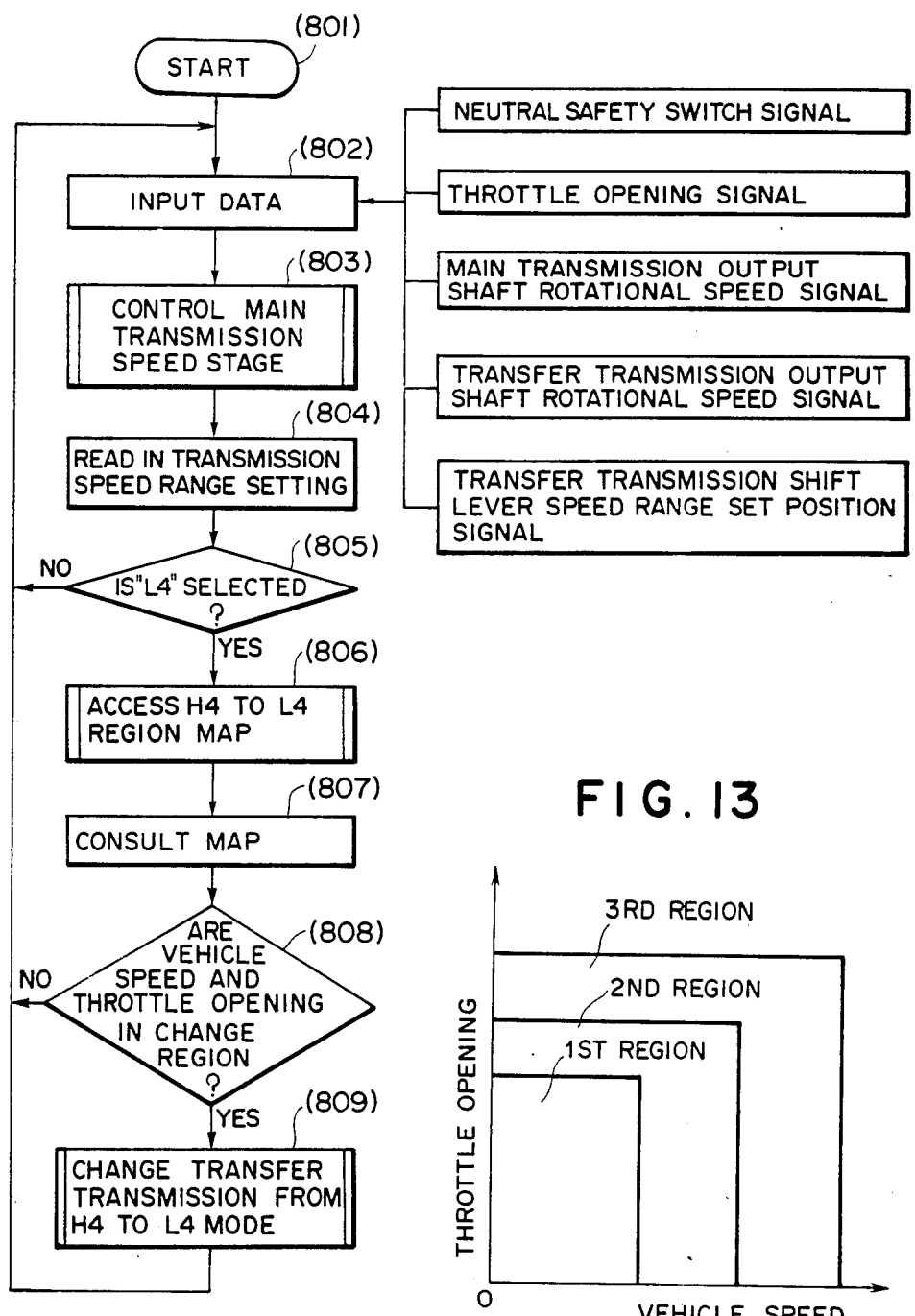
FIG. 12, which is similar to FIG. 7, is a flow chart of the operation of a microcomputer incorporated in said electrical control system for said transmission, according to said second preferred embodiment of the present invention.

Now, with reference to the flow chart shown in FIG. 12, the operation of this second preferred embodiment of the electrical control system of the present invention will be explained in detail, insofar as it need be understood in order to comprehend the principle of said second preferred embodiment of the present invention.

At the START block (801) the engine of the vehicle is started by turning the ignition switch on, and the program starts. Next, in the (802) block, the CPU of the microcomputer, under control of the program, inputs data from its various sensors detailed above, i.e., inputs: the neutral safety switch signal from the neutral safety switch 601; the transmission output shaft rotational speed signal from the transmission output shaft rotational speed sensor 602; the transfer transmission shift lever speed range set position signal from the transfer transmission shift lever speed change setting position sensor 606; the transfer transmission output shaft rotational speed signal from the transfer transmission output shaft rotational speed sensor 604; and the throttle opening signal from the throttle opening sensor 605. Next, in the (803) block, the speed stage selection control of the main transmission 10 is performed in a manner which is per se known in the transmission art. And next, in the block (804), the transmission speed change setting is read in.

Next, in the (805) block, the flow of control branches according as to whether or not the L4 range is selected, or not; if the select lever 401 is set to the "L4" position, then the flow of control passes to the block (806), whereas, on the other hand, if the select lever is not set to the "L4" position, that is, if the select lever is set to the "H2" position or the "H4" position, then the flow of control is cycled around again, to again pass back to the (802) block and repeat the above explained cycle.

Figure 13:
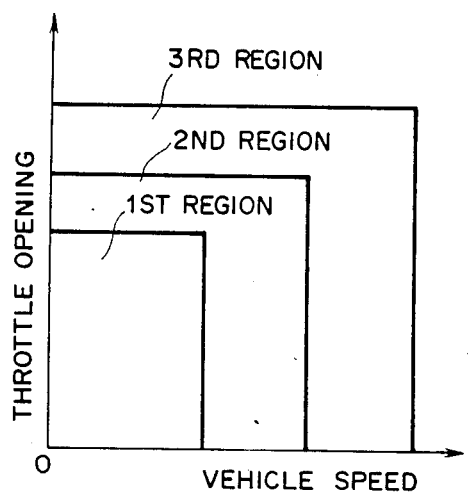
FIG. 13, which is similar to FIG. 8, is a shift diagram in which vehicle speed is shown along the horizontal axis and engine load (i.e. throttle opening) is shown along the vertical axis, showing the various four wheel drive possible engagement operational areas according to main transmission speed stage, in this second preferred embodiment.

In the former case, i.e. if the select lever 401 is set to the "L4" position, then the flow of control passes to the block (806), wherein a H4 to L4 speed change region map such as the map exemplarily shown in FIG. 13 is accessed to be used (such as by being read into the microcomputer memory). Next, in the block (807), the vehicle speed range and throttle opening range for which an H4 to L4 change is possible for the current shift lever position are extracted from the map of FIG. 13, i.e. said map is consulted; and next, in the block (808), a test is made as to whether the current value of the vehicle speed and the current value of the throttle opening are both within these ranges, or not. If the answer to this test is NO, so that no question of changing over the transfer transmission arises, then again the flow of control is cycled around again, to again pass back to the (802) block and repeat the above explained cycle; but, if the answer to this test is YES, so that the transfer transmission should be changed over, then the flow of control passes to the (809) block, wherein the transfer transmission 40 is indeed changed over from the H4 operational mode to the L4 operational mode, by the means explained hereinabove including turning the solenoid S4 ON. And, finally, again the flow of control is cycled around again, to again pass back to the (802) block and repeat the above explained cycle.

Thus, in this second preferred embodiment, the transfer automatic control device 500 controls the input pressure (which depends upon vehicle speed and throttle opening) of the valve 440 to the conduit 1M which is communicated to the conduit 1, so that when the vehicle speed and the throttle opening are at least certain determinate values the change from high speed to low speed stage is prevented.

Accordingly it is seen that, according to both the disclosed preferred embodiments of the present invention, there is provided a transmission control system for an automatic transmission system including a main transmission and a selectively actuatable two/four wheel drive transfer transmission, which obviates the problems outlined hereinbefore with respect to the prior art, and which can cause the transmission to operate well both in the four wheel drive operational mode and in the two wheel drive operational mode. Thus, the vehicle driver is enabled to use the transfer transmission in the low speed operational mode to as great an extent as possible, by adjusting the range for low speed operation of the transfer transmission according to the set speed stage of the main transmission. Thereby, this transmission control system for an automatic transmission can avoid troublesomely great transmission torque shock, and can avoid engine overrunning and violently strong engine braking.

Although the present invention has been shown and described with reference to the preferred embodiments thereof, and in terms of the illustrative drawings, it should not be considered as limited thereby. Various possible modifications, omissions, and alterations could be conceived of by one skilled in the art to the form and the content of any particular embodiment, without departing from the scope of the present invention. For example, although in the shown preferred embodiments the case for the driver changing from the H4 operational mode to the L4 operational mode has been described, in fact the same effect can be obtained from setting the range for speed change possible according to the speed change ratio of the main transmission for the L4 to H4 change, or for the H4 to L4 automatic change, independently of driver actuation. Other variations also could be utilized. Therefore it is desired that the scope of the present invention, and of the protection sought to be granted by Letters Patent, should be defined not by any of the perhaps purely fortuitous details of the shown preferred embodiments, or of the drawings, but solely by the scope of the appended claims, which follow.

TABLE 1

| TRANSMISSION RANGE/SPEED | CLUTCHES C0-C1-C2 | BRAKES B0-B1-B2-B3 | ONE-WAY CLUTCHES F0-F1-F2 |
|---|---|---|---|
| P | O-X-X | X-X-X-X | |
| R | O-X-O | X-X-X-O | L-F-F |
| N | O-X-X | X-X-X-X | |
| D 1 | O-O-X | X-X-X-X | L-F-L |
| 2 | O-O-X | X-X-O-X | L-L-F |
| 3 | O-O-O | X-X-O-X | L-F-F |
| 4 | X-O-O | O-X-O-X | F-F-F |
| S 1 | O-O-X | X-X-X-X | L-F-L |
| 2 | O-O-X | X-O-O-X | L-L-F |
| 3 | O-O-O | X-X-O-X | L-F-F |
| L 1 | O-O-X | X-X-X-O | L-F-L |
| 2 | O-O-X | X-O-O-X | L-L-F |

TABLE 2

| | P | R | N | D | S | L |
|---|---|---|---|---|---|---|
| CONDUIT 2 | X | X | X | O | O | O |
| CONDUIT 3 | X | X | X | X | O | O |
| CONDUIT 4 | X | X | X | X | X | O |
| CONDUIT 5 | X | O | X | X | X | X |

TABLE 3

| POSITION OF LEVER 401 | ENGAGEMENT CONDITIONS | | | SPEED RATIO |
|---|---|---|---|---|
| | C3 | B4 | C4 | |
| H2 (direct two wheel drive mode) | O | X | X | 1 |
| H4 (direct four wheel drive mode) | O | X | O | 1 |
| L4 (direct four wheel drive mode) | O | X | O | 1 |
| L4 (reduction four wheel drive mode) | X | O | O | 3.0 |

What is claimed is:

1. For an automatic transmission system for a vehicle, comprising a main transmission unit which can be set to any one of a plurality of speed stages, an auxiliary transmission unit which is connected in series with said main transmission unit and can be selectively set to either a first speed reduction ratio or a second speed reduction ratio substantially larger than said first speed reduction ratio, and a means for manually controlling said auxiliary transmission unit to select either said first speed reduction ratio or said second speed reduction ratio,
a transmission control system comprising:
(a) a means for controlling said main transmission unit automatically to provide each selected one of said plurality of speed stages according to operational conditions of the vehicle; and
(b) a means for controlling said auxiliary transmission unit to override said manual control means in a manner only to prevent shifting of said auxiliary transmission unit to said second speed reduction ratio according to vehicle speed, throttle opening and according to which of said plurality of speed stages said main transmission unit is set, wherein said override means includes means responsive to a specific combined range of vehicle speeds and throttle openings for each of said speed stages.

2. A transmission control system according to claim 1, wherein the vehicle has four wheels, and said transmission system further comprises a transfer transmission unit connected in series with said main and auxiliary transmission units selectively to provide a two wheel drive operational mode in which driving power is transmitted to only two wheels of the vehicle and a four wheel drive operational mode in which driving power is transmitted to four wheels of the vehicle, said manual control means also controlling said transfer transmission unit and having at least three manually selectable shift positions including a first shift position which provides said two wheel drive operational mode in said transfer transmission unit and said first speed reduction ratio in said auxiliary transmission unit, a second shift position which provides said four wheel drive operational mode in said transfer transmission unit and said first speed reduction ratio in said auxiliary transmission unit, and a third shift position which provides said four wheel drive operational mode in said transfer transmission unit and said second speed reduction ratio in said auxiliary transmission unit.

3. A transmission control system according to claim 1, wherein said plurality of speed stages includes a first speed stage and a second speed stage, said second speed stage having a reduction gear ratio smaller than that of said first speed stage, wherein said specific combined range comprises a first region bordered by a coordination of vehicle speed and throttle opening for said first speed stage for not preventing the shifting of said auxiliary transmission unit to said second speed reduction ratio, said first region being totally included within and smaller than a second region bordered by a coordination of vehicle speed and throttle opening for said second speed stage for not preventing the shifting of said auxiliary transmission unit to said second speed reduction ratio.

4. A transmission control system according to claim 1, wherein said plurality of speed stages includes a first speed stage, a second speed stage and a third speed stage, said second speed stage having a reduction gear ratio smaller than that of said first speed stage, said third speed stage having a reduction gear ratio smaller than that of said second speed stage, wherein said specific combined range comprises a first region bordered by a coordination of vehicle speed and throttle opening for said first speed stage for not preventing the shifting of said auxiliary transmission unit to said second speed reduction ratio, said first region being totally included within and smaller than a second region bordered by a coordination of vehicle speed and throttle opening for said second speed stage for not preventing the shifting of said auxiliary transmission unit to said second speed reduction ratio, and wherein said second region is totally included within and smaller than a third region bordered by a coordination of vehicle speed and throttle opening for said third speed stage for not preventing the shifting of said auxiliary transmission unit to said second speed reduction ratio.

* * * * *